SYSTEM FOR PROCESSING DIRECT DIALLED INTERNATIONAL TELEPHONE CALLS

Filed June 25, 1969 3 Sheets-Sheet 1

United States Patent Office 3,517,136
Patented June 23, 1970

3,517,136

SYSTEM FOR PROCESSING DIRECT DIALLED INTERNATIONAL TELEPHONE CALLS

Rhys A. Fairbairn, Willowdale, Ontario, Canada, assignor to Northern Electric Company Limited, Montreal, Quebec, Canada Continuation-in-part of application Ser. No. 497,218, Oct. 18, 1965. This application June 25, 1969, Ser. No. 839,791
Int. Cl. H04q 3/56
U.S. Cl. 179—18 9 Claims

ABSTRACT OF THE DISCLOSURE

A system for processing long distance telephone calls using direct dialling, especially suitable for trans-oceanic calls between two separate numbering complexes, in which a path to a gateway office of the subscriber's complex is established on a link-by-link basis, whereupon the longer than normal number of the called telephone in the other complex is passed to the gateway office on an end-to-end basis.

This application is a continuation-in-part of U.S. Pat. application Ser. No. 497,218 filed Oct. 18, 1965, and now abandoned.

This invention relates to a system for processing long distance telephone calls, and more particularly, it relates to a system for processing direct distance dialled calls from one numbering plan complex, typically the North American numbering plan complex to a second numbering plan complex, typically an overseas numbering plan complex.

The North American numbering plan complex or system normally requires eleven digits for direct distance dialled long distance calls. One or more preliminary digits, e.g. a "1," or in some cases "112" or "0" may be used as an access code to permit access to the long distance equipment. In some common control central offices no access code is required. In any event the access code digit or digits are not passed throughout the network. The next group of three digits represents an area code; the following group of three digits is an office code or designation within the area and the last four digits represent a particular subscriber's number. This calls for a total of ten digits to be handled in each office. However to adapt to those offices that used to exist having a final letter or station digit the North American telephone equipment is generally designed to register and switch, and to handle in general, eleven digits.

A scheme for direct distance dialling to areas outside the North American numbering plan system, hereinafter referred to as overseas direct distance dialling will normally require the dialling of more than eleven digits. For example, a country code of two or three digits may be used to designate a particular country being called. The country code digits, when added to the ten or so digits normally used in many countries, immediately brings the total to twelve or thirteen digits. A two or three digit access code, such as "11," "01" or "011" will probably be used to differentiate overseas calls from ordinary long distance calls. Risk of confusion with a call to the operator for which the subscriber dials "0" is avoided on a time basis. After dialling "0," if no further digit is dialled within say 5 seconds, the call will be connected to the operator.

Such large numbers present a problem in automatic processing of the call, because when an overseas call is initiated from a subscriber, a connection is usually established between the subscriber and a gateway office which will normally be located at a considerable distance from the subscriber. The gateway office is so named because it is located at an overseas cable termination and has access to the overseas cable, thus in effect providing an overseas gateway. (It could alternatively have access to overseas radio link communications equipment but the same principle is involved, namely, that there will be only a relatively few "gateway" offices having access to the overseas equipment.) To reach the gateway office from the subscriber, the call must, according to the normal routing, be extended through a number of intermediate toll offices, and at each stage in the routing of the call, the dialled digits are passed link-by-link from one intermediate office to the next, stored and regenerated. With a large number of digits, this procedure would take an undesirably long period of time, and further, it would be necessary to modify the equipment in each office en route so that it could handle an increased number of digits. In fact, if the call were to be processed through a gateway office in the conventional manner, it would be necessary to modify virtually all North American equipment so that it could handle these large numbers. Such modification would be extremely expensive and economically undesirable, particularly since only a small fraction of the total calls use more than 10 digits.

Accordingly, it is an object of the present invention to provide a system for direct distance overseas dialling in which modifications of inter-toll (i.e. en route) offices, or exchanges is unnecessary, thus reducing the disruption required to the North American telephone system in order to enable it to handle direct distance dialled overseas calls. Certain modifications and additions to existing equipment are necessary, of course, but the major modifications are confined to a relatively small number of central offices, and to the gateway offices which connect to the overseas cable (or radio link) equipment.

Other objects and advantages of the present invention will appear from the following disclosure, in which the embodiments are illustrative, the broad scope of the invention being limited primarily by the appended claims.

Figure 1:
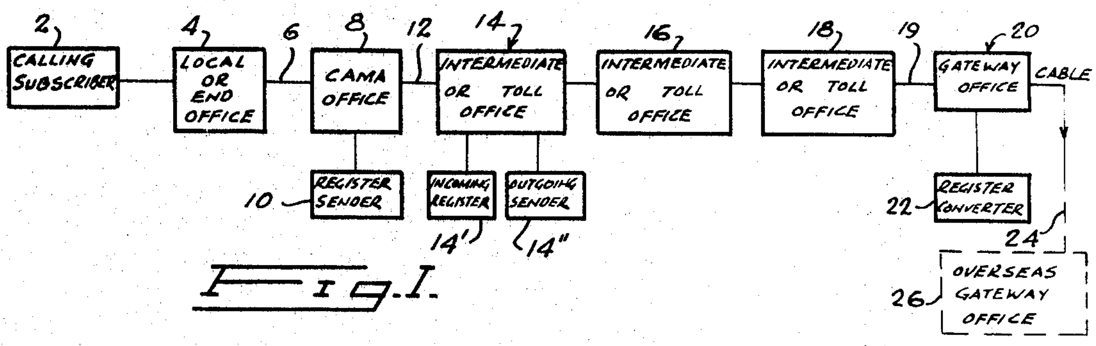
FIG. 1 is an overall block diagram illustrating the principles of the present invention.

Reference is first made to FIG. 1, which is a block diagram illustrating in simplified form the general principles of the present invention. In FIG. 1 there is shown a subscriber 2 connected to a local or end office 4, which may be of any well known type, such as a step-by-step office, a crossbar office, or an SA–1 office. It may be noted that the SA–1 office is a rural telephone exchange installed at a number of locations in Canada, and discussed in a paper presented at the second Canadian I.R.E. symposium at Montreal, Nov. 17, 1962 by R. Kenedi and C.M.H. Shiu. The SA–1 system is also discussed in a paper entitled "Common Control Switching System SA–1 Community Crossbar" by J. M. Long and A. Vennos, published in June 1965, in Northern Electric Technical Bulletin T126–TB. The SA–1 system will be further referred to presently.

The local or end office 4 is, in the illustrative connection shown in FIG. 1, connected via a trunk link 6 to Cama office 8 of the crossbar tandem type, provided with a special overseas register sender 10 which will be discussed in more detail shortly. "Cama" stands for "Centralized Automatic Message Accounting" and indicates that the office is equipped to make records of toll calls, and charges therefor, for a number of local offices. The term "tandem" indicates that there are no line link frames terminating subscriber lines in this office; only trunking connections are handled. From the tandem office 8, the overseas call is routed over a trunk link 12 to an intermediate toll office 14, and then through further intermediate toll offices here numbered as 16, and 18, and their interconnecting links to a trunk link 19 leading to a gateway office 20 equipped with a special register-converter 22 to be discussed in more detail presently. The gateway office 20 has access to an overseas cable 24 which terminates at its overseas end in an overseas gateway office 26, shown in dotted lines in FIG. 1.

When a subscriber wishes to dial direct to an overseas country, it is necessary to establish the type of connection shown in FIG. 1, between the subscriber 2 and an appropriate gateway office. If the subscriber is located somewhere in central North America (for example in Winnipeg or Chicago), as will be assumed henceforth to be the case, and if the subscriber wishes to reach a number in, for example, London, England, it is necessary to establish a connection between the subscriber and a gateway office on the east coast of North America, for example at Montreal or New York. Conversely, if the subscriber is dialling a number in Australia or Japan, it will be necessary to establish a connection between the subscriber and a west coast gateway office, for example Vancouver or San Francisco. The connection between the subscriber 2 and the gateway office 20 will permit the overseas number to be passed forward from the subscriber to the gateway office, and from the gateway office, the call is extended forward over the cable 24 to the overseas gateway office 26, and thence to the called party (not shown).

As previously mentioned, difficulties arise in extending overseas calls over a connection of the type shown in FIG. 1, since the overseas number will commonly contain more digits than the number of digits which the offices 4, 8, 14, and 18 are normally designed to handle. For example, the intermediate or toll office 14 is shown as having a conventional incoming register 14' and a conventional outgoing sender 14'', these pieces of equipment being capable of handling only the normally encountered number of digits (e.g. ten or eleven) and not the larger number necessary for an overseas call. Modification of the intermediate or toll offices would be expensive and accordingly this invention provides an arrangement under which it is unnecessary to modify the intermediate offices. The system of the present invention is basically as follows:

When the subscriber 2 wishes to dial an overseas number, he will dial an access code, for example, "011," followed by the overseas number, which may consist for example of twelve digits. The end office 4 recognizes the access code and immediately establishes a connection over the trunk 6 from the subscriber 2 to the tandem office 8 and its special register-sender 10. This connection is established in the interdigital time interval between the end of the access code digits and the commencement of the following digits (which will be the country code digits) so that the country code and following digits (representing the overseas number itself) are passed directly into the tandem office 8.

This procedure, by which after the dialling of the access code digits, the remainder of the dialled digits are passed directly to the tandem office 8, requires no modification in the end office 4 if it is the step-by-step type. Step-by-step offices are normally designed to pass on all of their dialled digits immediately, and the access code will simply establish the required connection through to the tandem office 8. Similarly, if the end office 4 is of the SA–1 type, no modification is required since SA–1 offices are designed to recognize all outgoing calls and to pass the digits of the outgoing called number directly to the appropriate central office. However, if the end office 4 is of the crossbar type, for example the number 5 crossbar, then modification thereto will be required, since crossbar offices are normally designed to receive and store all dialled digits and then to pass them forward. Typical modifications required for a crossbar end office will be discussed presently.

The tandem office 8 is equipped, as mentioned, with a special overseas register-sender 10. The register-sender 10 contains a normal register enlarged sufficiently to store an overseas number. For purposes of discussion, it is assumed that the register-sender 10 is of capacity sufficient to accommodate and handle sixteen digits, but it will be recognized that it may be designed to handle more or less than this number, depending upon the international numbering plan arrangement adopted. The register-sender 10 determines, from the country code digits (and if desired, also from the area code digits), which gateway office, east or west, is to be used. If the call is to Europe, then the gateway office will be an east coast gateway office, while if the call is for example, to Japan, then a west coast gateway office will be used. The register-sender 10, after determining the appropriate gateway office, provides and sends forward the necessary digits to establish a connection to that gateway office. These digits will typically comprise a three digit code in order to establish a connection to the gateway office itself. Thus, the overseas register-sender 10 will typically send forward three-digits. These three digits are not, of course, the twelve digit overseas number which the subscriber has dialled; those digits are stored in the register-sender 10 for later use.

The three digits generated or "prefixed" by the register-sender 10 are passed forward in the usual manner from the tandem office 8 over an appropriate trunk (shown at 12) to the appropriate next office shown as toll office 14, which is shown as a crossbar office but which could alternatively be step-by-step (equipped with register senders). The call is then routed by the office 14 to the appropriate next office shown as office 16, and so on until a connection is set up link-by-link, i.e., an office at a time, to the gateway office 20. When a connection is established to the gateway office 20, this office sends a "proceed-to-send" signal back to the tandem office 8 for the latter to send forward the overseas number.

For this purpose, the register-sender 10 in the office 8 is equipped with transmission means to be discussed in more detail later. When the gateway office sends the "proceed-to-send" signal back (over the talking connection established between the offices 8 and 20) to the office 8, the register-sender 10 spills forward the twelve digit (for example) overseas number to the gateway office 20 on an end-to-end basis in contrast to the link-by-link setting up of the connection between offices 8 and 20. This sending forward of the overseas number is equivalent simply to talking over the connection established between the office 8 and 20, so that it is unnecessary to modify the intermediate offices to handle large numbers.

The link-by-link setting up of the connection between offices 8 and 20 is carried out using one of the conventional telephone signalling techniques. The subscriber will use either dial pulse signalling (as has been assumed in the specific circuits described below), or Touch Tone (registered trademark) which is a special form of multi-frequency signalling available to subscribers that uses a combination of two frequencies selected each from a respective group of four frequencies, the frequencies used being different from those employed in the standard multi-frequency signalling employed in the network, in order to avoid confusion between them. Once the called number is in the network, the prefixed digits will be fed forward link-by-link using either dial pulsing or the standard multi-frequency signalling (or eventually Touch Tone, if this later becomes available in the network).

For the end-to-end transmission of the whole called number multi-frequency signalling is the most convenient to use.

When the called overseas number reaches the gate-way office 20, it is received by the register converter 22, stored, converted, if necessary, to the type of signalling required by the cable 24, and out-pulsed forward over the cable.

This disclosure will not describe in detail the particular circuits that may be used in accomplishing the handling of calls to points outside North America numbering plan complex as just described, since those skilled in the art will have no difficulty in applying well established techniques for this purpose. However, a more detailed block diagram type discussion will now be presented, commencing with the local or end office 4 and progressing from there, to demonstrate the ease with which well established techniques may be applied.

As mentioned previously if the end office 4 is of the step-by-step or SA–1 type, no modification is needed, since a step-by-step office automatically passes its digit information onward as soon as it is received and since an SA–1 office automatically recognizes out-going calls and makes a connection to an appropriate outgoing trunk for the remainder of the digit information to be passed to an appropriate next office. However, if the end office 4 is of the crossbar type, then modifications are necessary, and FIG. 2 illustrates in block diagram form one manner in which such modifications may be made.

Figure 2:
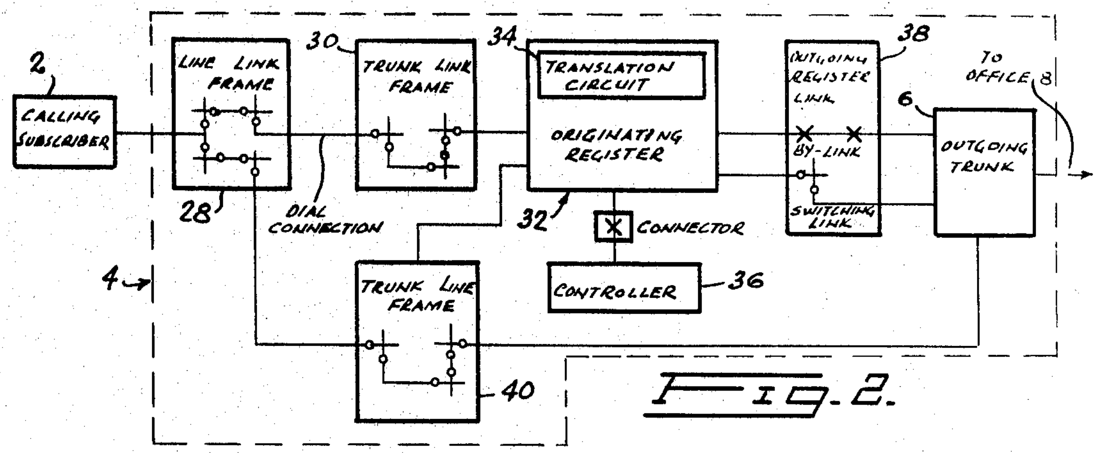
FIG. 2 is a block diagram of a local or end office of FIG. 1.

In FIG. 2, the calling subscriber 2 is shown as being connected to a line link frame 28 and through a trunk link frame 30 to an originating register indicated generally at 32. The calling subscriber will have been connected to the originating register 32 in the conventional manner, by means of a dial tone marker (not shown). When the subscriber 2 is supplied with dial tone by the originating register 32, he begins to dial, and more specifically he dials the overseas access code "011." The originating register 32 is modified to provide the routing feature present in the register of an SA–1 office, i.e. it contains a conventional translation circuit shown in block diagram form at 34, which recognizes that the overseas access code has been dialled and which thereupon operates an appropriate relay (not shown) to call in a controller 36 similar to that used in the SA–1 office. The end office 4 of FIG. 2 also contains an outgoing register link 38 (similar to that used in the SA–1 office) which provides by-link and switching link connections. The controller 36 grounds start leads (not shown) to operate the by-link and the switching link, the by-link establishing a connection from the register 32 to the outgoing trunk 6 during the inter-digital time interval between the dialling of the last access code digit and the dialling of the first country code digit. The switching link takes somewhat longer to operate. The remainder of the digits dialled after the access code digits (i.e. the entire overseas number itself) are then outpulsed directly from the subscriber over the trunk 6 to the tandem office 8 of FIG. 1.

The register 32 in the crossbar end office of FIG. 2, on signal from the controller 38, establishes a talking path connection in the usual way through a trunk link frame 40 between the calling subscriber 2 and the outgoing trunk 6.

After the called number is outpulsed to the office 8, the originating register 32, controller 36, and outgoing register-link 38 disconnect on signal from the register-sender 10.

In this manner, the subscriber's own pulsing is extended through to the tandem office 8. The crossbar end office 4 is thus, for overseas calls, converted in effect to a step-by-step office. The modifications suggested in order to achieve this objective are all relatively simple and will present no difficulty to persons skilled in the art.

Figure 3:
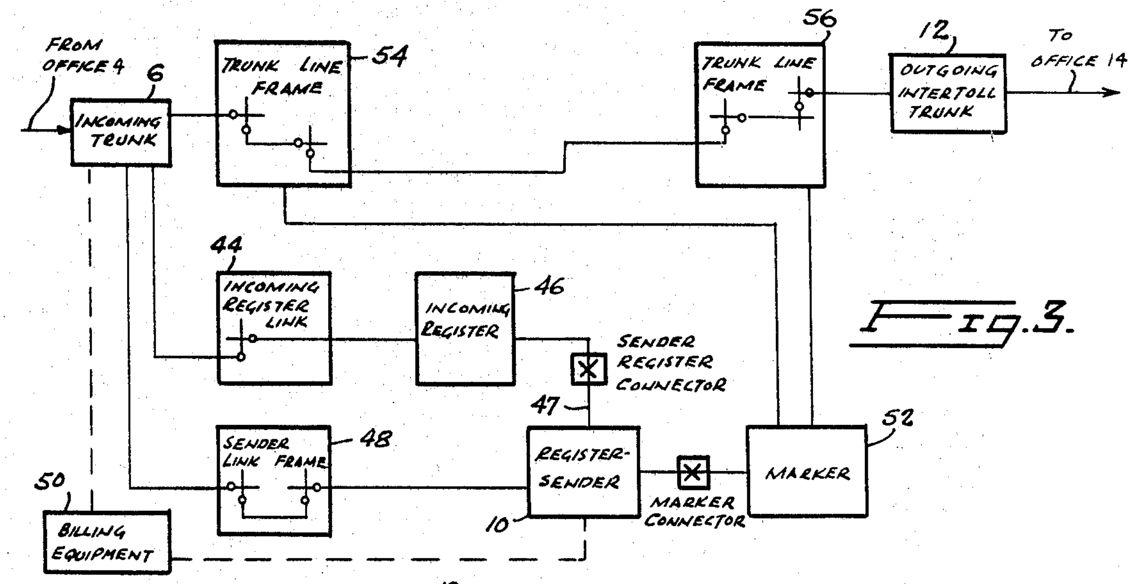
FIG. 3 is a block diagram of a Cama office of the crossbar tandem type of FIG. 1.

Reference is next made to FIG. 3, which shows in block diagram form a portion of a typical Cama office 8 of the crossbar tandem type.

When the trunk 6 is seized from the office 4, it in turn commences seizure of the register-sender 10, through a sender link frame 48. This connection takes time to establish, and since as soon as digits are dialled by the subscriber 2, they are transmitted directly to the Cama office 8, by-link operation is needed. Accordingly, the trunk 6, upon seizure from the office 4, also seizes an incoming register 46, through an incoming register link 44 (which provides immediate connection to the incoming register, so that no pulses are lost). The incoming register then receives the first three digits (after the access code digits) dialled by the subscriber. After it has received these digits, it connects via a sender register connector to the register-sender 10 and passes these three digits en bloc, over leads 47, into the register-sender 10. The remaining subscriber digits are dialled directly into the register-sender 10, through the sender link frame 48. This type of by-link operation is entirely conventional.

A further connection will be made (shown in dotted lines) from both the trunk 6 and the register-sender 10 to billing equipment indicated at 50, in order that a record of the call may be made and charges computed. The billing equipment will need minor modifications to adapt to overseas codes and rates.

As soon as the register-sender 10 receives a predetermined number of digits, i.e. three digits, six digits or whatever is desired, it calls in a completing marker 52 and passes enough digits into the latter for the marker to decode such digits and decide which gateway office and route are required. The marker 52 then establishes a connection between the appearance of the trunk 6 on a trunk link frame 54, and the appearance of the outgoing inter-toll trunk 12 on a trunk link frame 56. While it is performing this operation, the marker supplies the register-sender 10 with the three prefixed digits necessary to establish a talking path connection between the tandem office 8 and the gateway office 20. These three digits are then outpulsed by the register-sender 10 through the sender link frame 48, incoming trunk 6, the trunk link frame 54, and the trunk link frame 56, out over the inter-toll trunk 12 to the next toll office 14, where they are used to establish a connection with the next appropriate toll office, and so on until the gateway office 20 is reached.

Figure 4:
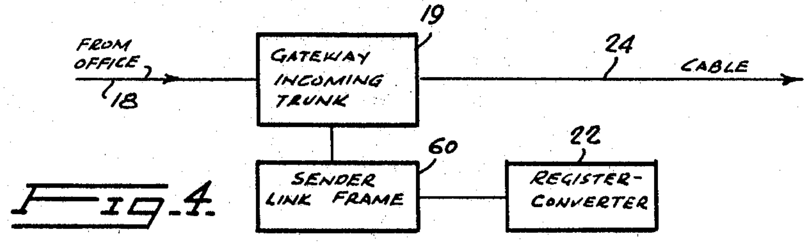
FIG. 4 is a block diagram of a gateway office of FIG. 1.

A portion of the gateway office 20 is shown in block diagram form in FIG. 4. As shown in FIG. 4, the gateway office includes a termination of the incoming trunk 19 assumed to be seized from the preceding toll office 18, the trunk 19 in turn leading to the cable 24, which connects to points outside the North American numbering plan complex. A connection is shown from the trunk 19 through a sender link frame 60 to the register-converter 22. The register-converter 22 includes relays (not shown) for cutting a connection through from the incoming trunk 19 to the cable 24 after the outpulsing functions of the register-converter 22 have been completed.

When the register-converter 22 is seized by the trunk 19, it sends back to the register-sender 10 a "proceed-to-send signal." The register-sender 10, which by now has received the entire overseas number, then spills forward this number end-to-end into the register-converter 22. The overseas number is converted by the register-converter 22 into signalling as required by the cable 24, and passed forward over the cable to extend the calls to overseas points.

Figure 5:
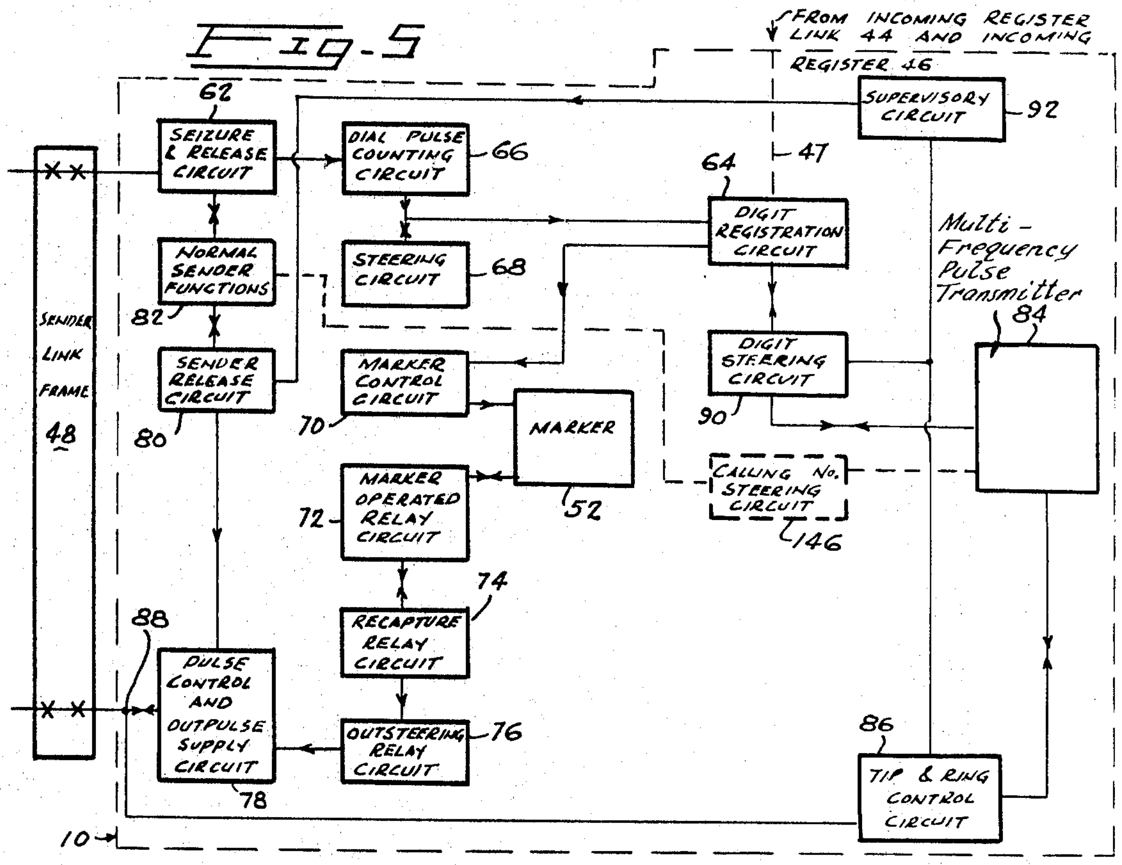
FIG. 5 is a block diagram of a register-sender of FIGS. 1 and 3.

Reference is next made to FIG. 5, which shows a more detailed block diagram circuit for the register-sender 10 of FIGS. 1 and 3. The various blocks shown in FIG. 5 will of course be variously interconnected, but for purposes of illustration, only those interconnections pertinent to the explanation of the present invention are shown.

As shown in FIG. 5, the register-sender 10 includes a seizure and release circuit 62 which acts as a primary connector to connect leads from the sender link frame 48 (i.e. from the incoming trunk 6) to the various parts of the special register-sender 10. The register-sender 10 also includes a digit registration circuit 64 which records and stores the digits of the called number in relay "bins" (not shown) in the conventional manner, using the usual two out of five code. The first digits of the called number received over the trunk 6 are passed into the digit registration circuit 64 through the by-link circuit constituted by the incoming register link 44 and the incoming register 46 (FIG. 2). The leads from the by-link circuit into the digit registration circuit 64 are shown in dotted lines in FIG. 5.

The remainder of the digits of the called number are passed into the digit registration circuit 64 via the sender link frame 48, through a dial pulse counting circuit 66 which counts the dial pulses received, and via a steering circuit 68 which steers the successive digits into appropriate relay bins of registration circuit 64. The digit registration circuit 64, and the steering circuit 68 are capable of handling sixteen called number digits.

Connected to the digit registration circuit 64 is a marker control circuit 70, which, after the digit registration circuit 64 receives a predetermined number of digits, seizes the marker 52. The marker 52 is of course not part of the register-sender 10 and is included in FIG. 5 only for purposes of illustration. The marker control circuit 70 could seize the marker 52 as soon as the seizure and release circuit 62 is seized by the leads from the sender link frame 48, but this would be uneconomical, since nothing further could be done until the digit registration circuit 64 had received some digits. Alternatively, the marker control circuit 70 could wait until all of the dialed digits had been received by the digit registration circuit 64, but this would be unnecessary, since the marker can act on information contained in only the first few digits. The marker control circuit 70 will be assumed to operate after the first three digits have been received by the digit registration circuit 64, and as soon as it operates, leads (not shown) are closed to pass these digits through from the digit registration circuit to the marker. (If three digits are to be passed through and a two out of five code is used, this means that fifteen leads are closed through to the marker.)

The marker 52 uses these first few digits to set up an outgoing trunk connection. In so doing, it performs its normal marker function, i.e. it decodes the digits, determines the three prefixed digits required to route the call to the appropriate gateway office, tests for and locates an appropriate outgoing link (i.e. trunk 12 of FIG. 3) and establishes a channel between the incoming and outgoing links 6 and 12 respectively. It may be noted that when the three routing digits are referred to as "prefixed," it is meant that these digits are provided by the marker and are not dialed by the subscriber. The term "prefixed" is not intended to convey the impression that these digits are inserted at the beginning of a longer number containing further digits.

The marker 52 is shown connected to a marker operated relay circuit 72 which records the three prefixed digits (on relays not shown) and also records the form in which the three digits are to be transmitted, i.e. either multi-frequency or dial pulse, depending upon the requirements of the following toll office. The information, as to whether multi-frequency or dial pulse signalling is required, is obtained from the outgoing trunk 12 which the marker selects.

The marker operated relay circuit 72 is connected to a recapture relay circuit 74 which takes the prefixed digits from the storage relays of the circuit 72 and transmits them to an outsteering relay circuit 76 which steers the three digits into a pulse control and outpulse supply circuit 78.

The pulse control and outpulse supply circuit 78 provides the type of pulsing required for the following intermediate or toll office 14, i.e. either multi-frequency or dial pulse. The starting of the outpulsing is controlled in a conventional manner by the selection of an outgoing trunk 12 and the connection of the outgoing trunk through the trunk link frames to the sender link frame 48, which connections are effected by the marker 52. The stopping of the outpulsing is controlled by a conventional sender release circuit 80, which is connected to the seizure and release circuit 62 through a block 82 labelled "normal sender functions." The sender release circuit 80 counts the digits outpulsed by the pulse control and outpulse supply circuit 78, and when three digits (which are the three prefixed digits used to establish a connection to the gateway office) have been outpulsed, the sender release circuit terminates the outpulsing.

The block 82 labelled "normal sender functions" contains conventional circuits for storing the incoming trunk number and location on the trunk link frame 54 (FIG. 3), recording the number of the equipment that will take care of the billing functions, selecting leads to the billing equipment 50, translating the calling number equipment location into a directory number, transmitting the called and calling numbers to the billing equipment 50, recording the class of call being received (e.g. by-link, non by-link, automatic message accounting, non-automatic message accounting, automatic number identification etc., calling number steering, calling number registration, sender timing, etc.).

The block 82 also contains conventional translation means for translating the called number and determining whether it belongs to an open or closed numbering plan. If the called number belongs to a closed numbering plan, it will note the number of digits that should be received and will instruct the end office (if crossbar) to release the common control equipment when this number of digits has been received. The release signal travels back through the seizure and release circuit 62, the sender link frame 48, and the trunk 6. If the called number belongs to an open numbering plan, means in the block 82 will start a time-out circuit which, if more than a few (e.g. 5) seconds have elapsed after receipt of a digit, will also instruct the end office (if crossbar) to release its common control equipment.

Reference is now made to the right hand side of FIG. 5, where there is shown in block diagram form a multi-frequency signalling transmitter 84. This transmitter 84 which is well known in the art is connected through a tip and ring control circuit 86, to point 88 which is the output of the pulse control and outpulse supply circuit 78. The transmitter 84 is thus connected to the outgoing trunk circuit. Upon receipt of a proceed-to-send signal from the gateway office, which signal will be sent when a connection is made to the gateway office, the transmitter 84 proceeds to send the overseas number out over the trunk circuits end-to-end to the gateway office 20. Digits are steered from the digit registration circuit 64 into the transmitter 84 by digit steering circuit 90 which is designed to steer 16 called number digits. The functions of the tip and ring control circuit 86 are conventional, e.g. to stop the transmitter 84 if trouble is encountered in the connection between the tandem office 8 and the gateway office 20. In the event of such trouble, the control circuit 86 calls in a supervisory circuit 92, and the circuit 92, which is connected back through the sender release circuit 80 to the block 82, initiates the sending of trouble tones back to the calling subscriber 2 and the disconnection of the register-sender 10 where necessary.

After the last digit has been transferred through the digit steering circuit 90 to the transmitter 84, the digit steering circuit 90 sends a signal to the supervisory circuit 92, which repeats a release signal to the sender release circuit 80. The sender release circuit 80 in turn operates a release relay (not shown) in the seizure and release circuit 62. Circuit 62 thereupon operates a cut through relay (not shown) to disconnect the register sender 10 and to cut a direct trunk connection through from the incoming trunk 6 to the outgoing inter-toll trunk 12, via trunk link frames 54 and 56 (FIG. 3).

Figure 6:
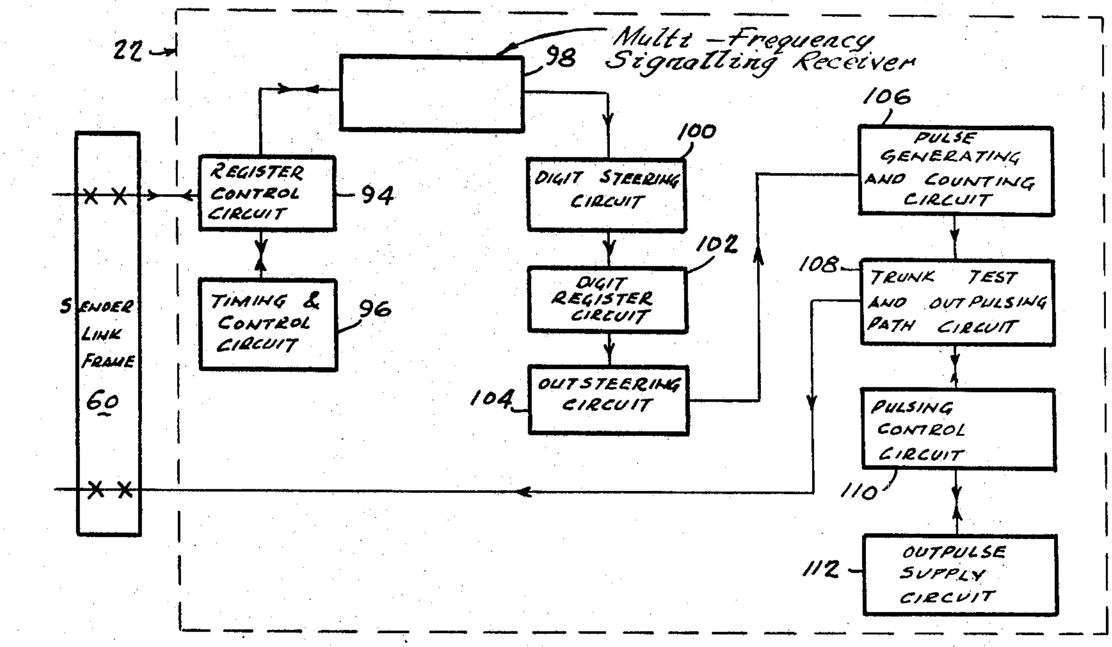
FIG. 6 is a block diagram of a register-converter of FIGS. 1 and 4.

Reference is next made to FIG. 6, which shows in block diagram form pertinent portions of the gateway register-converter 22. As mentioned in connection with FIG. 4, the gateway register-converter 22 is seized through the sender link frame 60 as soon as a connection is set up to the gateway office by means of the three prefixed digits. More specifically, a register control circuit 94 is seized and this operates a start relay therein (not shown) to commence overall operation of the register-converter 22. The register control circuit 96 which contains timing circuits (not shown) for release of the register-converter 22 as necessary in the event of trouble, for example, in the event that the overseas call is abandoned in the middle of dialling the same.

Also connected to the register control circuit 94 is a multifrequency signalling receiver 98, which is actuated upon seizure of the control circuit 94 and which then sends back a proceed-to-send signal to the transmitter 84 of FIG. 5. The overseas number is spilled forward into the receiver 98 where it is converted into a series of voltage levels in the conventional manner. The received digit information is then passed through a digit steering circuit 100 (capable of steering sixteen called number digits). It is necessary to have provision for storing the received overseas number, because it may be received at a faster rate than the rate at which it will be outpulsed over the cable.

Connected to the digit register circuit 102 is an out-steering circuit 104 to which is connected a pulse generating and counting circuit 106, a trunk test and pulsing path circuit 108, a pulsing control circuit 110, and an outpulse supply circuit 112. These circuits are all conventional, and it will be realized that although they are shown as separate blocks, they are in fact (as are all the blocks of FIG. 6) provided with the usual conventional interconnections.

As soon as the register-converter 22 is seized by the incoming trunk 19 from the preceding toll office, thus operating register control circuit 94, the trunk test and pulsing path circuit 108 is actuated to seize (through the sender link frame 60) the overseas cable 24. Seizure of the cable 24 operates a relay (not shown) in the pulsing control circuit 110 to start operation of the pulse generating and counting circuit 106. The pulse control circuit 110 ascertains from the cable 24 the type of outpulsing, that is required, e.g. dial pulse or multifrequency, and The stored digit information in the digit register circuit 112.

The stored digit information in the digit register circuit 102, as outsteered by the circuit 104, operates the pulse generating and counting 106 circuit which in turn operates the outpulse supply circuit 112 to outpulse the called number digits over the cable 24 to the overseas gateway office 26.

Afther the last called number digit has been steered out of digit register circuit 102, the next empty relay storage bin therein (not shown) operates a "finishing pulsing" relay (not shown) in pulsing control circuit 110, and this causes operation of a cut-through relay (not shown) to cut through a connection from the incoming trunk 19 to the cable 24 (FIG. 4) and to drop off (i.e. disconnect) the register-converter 22. The call has now been extended from the subscriber 2 to the overseas termination of the cable 24, and the processing of the call from this point on will depend upon the facilities of the overseas countries through which the call is being routed.

It will be realized that numerous modifications may be made within the scope of the present invention. For example, the office being shown as being provided with the register-converter 22 with its receiver 98, has been the gateway office 20 which can provide direct connection to the overseas cable 24. However, other considerations may dictate the placing of the register-converter 22 in a toll office (not shown) in the same city as the gateway office, such as toll office having trunks leading into the gateway office. This will not affect the basic features of the present invention, except that in such case it will be necessary to modify one additional office to handle the large overseas numbers. In such case, the office with the register-converter 22, will for the present invention, be the gateway office.

Figure 7:
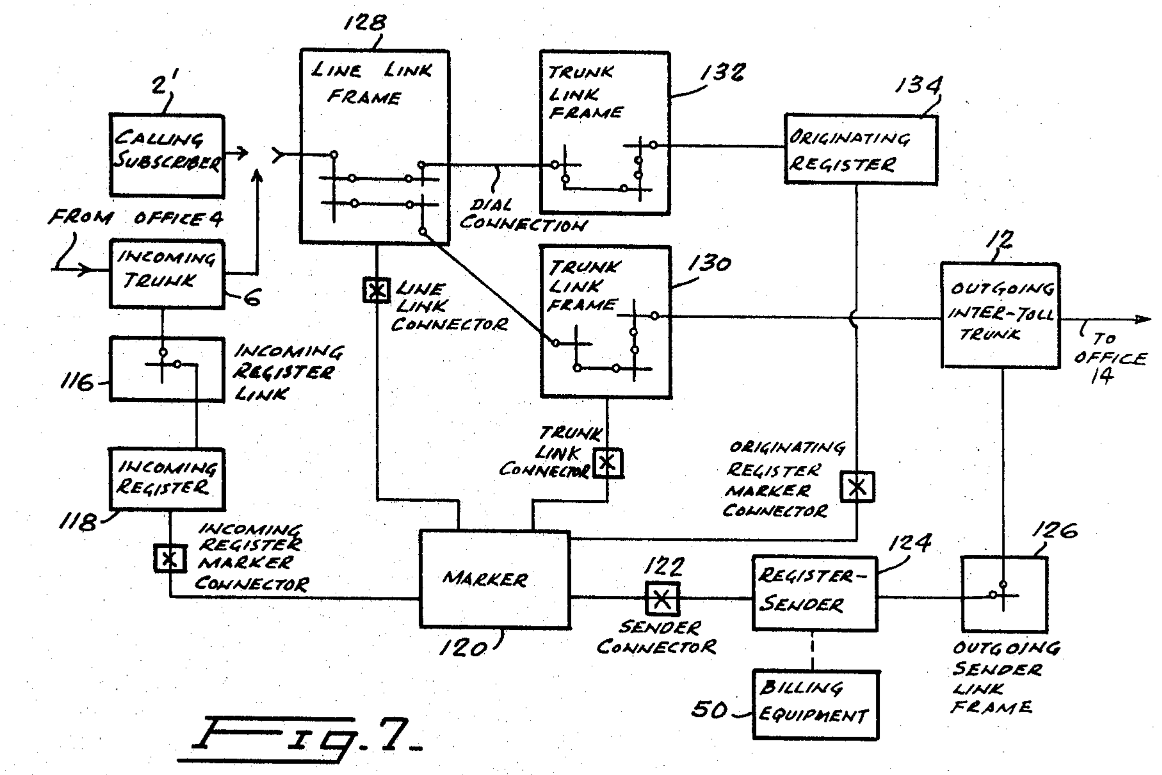
FIG. 7 is a block diagram of an end office equipped for Cama as modified in accordance with the present invention and FIG. 8 is a block diagram showing a modification of the arrangement of FIG. 1.

Instead of the office 8 being a Cama office of the tandem type, it may be an end office equipped for Cama. Such an office, could, in accordance with the present invention, be arranged as shown in FIG. 7. FIG. 7 illustrates the incoming trunk 6, from the local or end office 4, connected through an incoming register link 116 and an incoming register 118 (modified to receive sixteen called number digits) to a completing marker 120. The marker 120 is shown as connected through a sender connector 122 to a register-sender 124 being connected through an outgoing sender link frame 126 to the outgoing inter-toll trunk 12.

The operation of the circuit of FIG. 7 as so far described is much like that of FIG. 3. Digits received via the incoming trunk 6 are passed into the incoming register 118 and from there, through the marker into the register-sender 124. The register-sender 124 provides the marker 120 with information necessary for the marker to select three prefixed digits to establish a talking connection to the gateway office, and the marker thereupon establishes a channel between the appearance of the incoming trunk 6 on a line link frame 128, and a trunk link frame 130, and then to the outgoing inter-toll trunk 12. When the connection is established through to the gateway office, and a proceed to send signal is returned from the gateway office, the register-sender 124 spills forward the overseas number through the outgoing sender link frame 126 and the outgoing inter-toll trunk 12, over the talking path connection between the office of FIG. 7 and the gateway office.

If an overseas call is made by a calling subscriber 2' whose line terminates on line link frame 128, i.e. in respect of whom the office of FIG. 7 serves as a local or end office, then a dial connection is established in the usual manner through a trunk link frame 132 to an originating register 134 which is modified to receive sixteen called number digits. The originating register 134 receives the digits, and passes them through the marker 120 into the register sender 124. The processing of the remainder of the call is similar to that described in the case of a call entering the office of FIG. 7 via the incoming trunk 6, i.e. an outgoing connection is set up between the subscriber 2' and the outgoing inter-toll trunk 12, and the three prefixed digits are outpulsed over this trunk to establish a talking path connection to the gateway office, following which the overseas number is spilled forward end-to-end to the gateway office. The register sender 124 then disconnects, leaving a connection cut through directly between the subscriber 2' and the gateway office.

It will be realized that the system described in the foregoing discussion may be used for operator direct distance dialling prior to the introduction of subscriber direct distance dialling service. This use of the invention will allow the operator at any toll center equipped with a register-sender such as the register-sender 10 to dial overseas calls and will avoid the necessity of having such calls handled by special gateway operators. The progress of an operator dialled call will be generally similar to that of a subscriber detailed call described previously, except that no modification of local or end office is required.

The system may also be used for TWX (teleprinter) instead of telephone traffic.

Figure 8:
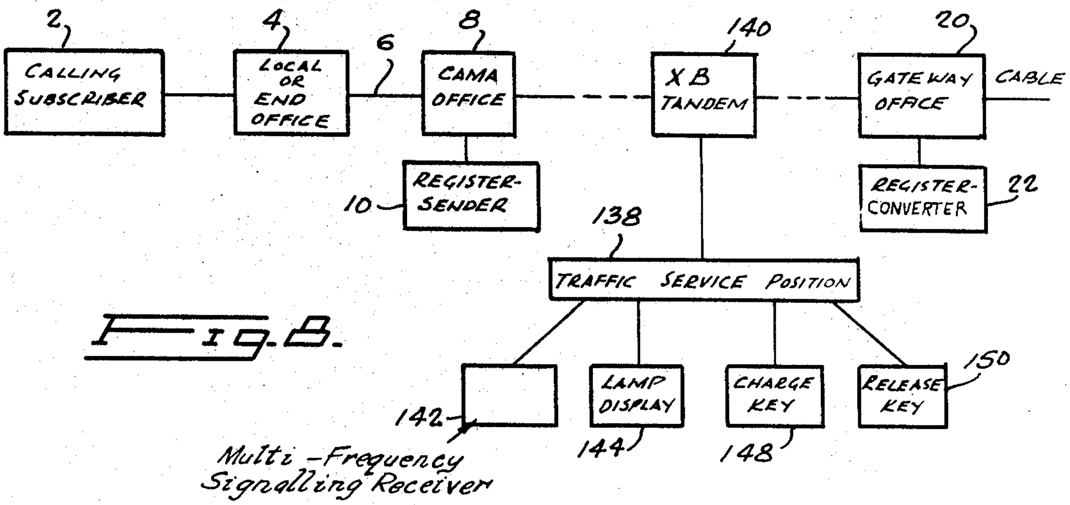

The system of the present invention may, with certain modifications also be used for subscriber dialled overseas person-to-person calls. In this case a different access code, e.g. "01," will be used, instead of the station to station access code "011." The person to person access code will cause the end office 4 to signal the Cama office 8 to prefix different digits (in routing to the gateway office) than are used for station-to-station calls. These different prefixed digits will call in a "traffic service position" 138 (FIG. 8) at a high ranking office 140 between the Cama office 8 and the gateway office 20. A traffic service position is an operator switchboard (well known in the art) which permits subscriber dialled person-to-person calls and allows the operator to press a "charge" key which permits charging operation of the billing equipment to commence once the called person has been reached. It also provides a lamp display of the called and calling numbers for the operator, so that she may replace the call later if necessary. The traffic service position 138 could be located at the gateway office 20, if desired.

The traffic service position 138 includes a multi-frequency signalling receiver 142 which receives the called number (as this number is passed along to the gateway office) and transfers the same to a lamp display 144 for the benefit of an operator who has been alerted by the receipt of the call at the traffic service position.

After the called number is received at the traffic service position, a signal is sent by the latter to the register-sender 10, which then sends forward the calling number to the traffic service position. The calling number was recorded in the Cama office 8 in the normal course of events for use in billing. For purposes of the feature now being described, it is assumed that the calling number (stored in a registration circuit forming part of block 82) is steered by a calling number steering circuit 146 (shown in dotted lines in FIG. 5) into transmitter 84 for transmission to be the traffic service position 138.

If the call is completed to the called person, an operator at the traffic service position 138 presses a charge key 148 which permits charging operation by the billing equipment 50 to commence. Any suitable type of signalling from the traffic service position to the billing equipment 50 in the Cama office may be used for this purpose. If the call is not completed to the called party, the operator may ask the calling subscriber 2 if he wishes to replace the call later, and if he does, she records the called numbers, from the display 144, for later use in replacing the call. She then may break down the connection with a release key 150, which opens the crossbar switches at an appropriate point in the connection.

It will be evident that the feature of using a higher ranking office through which to concentrate subscriber dialled person-to-person calls, the higher ranking office having means to control billing or other equipment in the lower ranking office, thus to reduce the number of operators and operator positions required, is not limited to overseas calls. It may also be used for domestic calls within the North American continent.

The signalling of the Cama office 8 by the end office 4, upon dialling of the person-to-person access code, may be by any conventional means, such as by marking the trunk to the Cama office, or by routing the call to the Cama office over a special trunk reserved for person-to-person calls.

It may be noted that the type of signalling presently in use on the trans-oceanic telephone cables is the "No. 5 Signalling System," so designated by the United Nations' CCITT. Therefore, this is the type of signalling that would normally, at the present time, be outpulsed over the cable by the register-converter 22.

I claim:

1. A system for processing a direct distance dialled long distance call from a calling telephone to a called telephone, said system comprising (a) a sending office,
(b) a receiving office,
(c) at least one office located intermediate said sending and receiving offices,
(d) and a plurality of telephone links extending between adjacent pairs of said sending office, said at least one intermediate office, and said receiving office,
(e) said sending offices including,
  (i) means for receiving and storing the called number,
  (ii) means coupled to said means (e) (i) for decoding the number to determine said receiving office through which said call is to be routed, and for providing prefixed digits for routing said call from said sending office to said receiving office,
  (iii) and means coupled to said means (e) (i) and (e) (ii) for sending said prefixed digits forward link-by-link to establish a talking connection between said sending and receiving offices,
(f) said receiving office including means responsive to the establishing of said talking connection between said sending and receiving offices, for sending a proceed-to-send signal back over said talking connection to said sending office,
(g) said sending office including means responsive to said proceed-to-send signal for transmitting said called number end-to-end over said talking path to said receiving office,
(h) said receiving office further including
  (i) means for receiving said called number and for storing the same as stored digit information,
  (ii) and means for outpulsing said stored digit information to a further office.

2. A system for processing a direct distance dialled long distance call from a calling telephone in a first numbering plan complex to a called telephone in a second numbering plan complex, said system comprising (a) a sending office in said first numbering plan complex,
(b) a gateway office in said first numbering plan complex, said gateway office having access to a communications link to a further office in said second numbering plan complex having access to said called telephone,
(c) at least one intermediate office in said first numbering plan complex, located intermediate said sending and gateway offices,
(d) said sending office including
  (i) means for receiving and storing the called number,
  (ii) means coupled to said means (d) (i) for decoding the called number to determine said gateway office to which said call is to be routed, and for providing prefixed digits for routing said call office by office through each said intermediate office to establish a talking connection, between from said sending office,
  (iii) and means coupled to said means (d) (i) and (d) (ii) for sending said prefixed digits forward said sending and gateway offices,
(e) said gateway office including means responsive to the establishing of said talking connection between said sending and gateway offices, for sending a proceed-to-send signal back over said talking connection to said sending office,
(f) said sending office including means responsive to said proceed-to-send signal for transmitting said called number end-to-end over said talking path to said gateway office,
(g) said gateway office including
  (i) means for receiving the called number and storing the same as stored digit information, (ii) and means for outpulsing said stored digit information over said communications link to said further office.

3. A system according to claim 2, wherein (h) said means (d) (i) is adapted to receive said called number by a form of signalling selected from the group consisting of dial pulse signalling and multi-frequency signalling, (i) said means (d) (iii) is adapted to send forward said prefixed digits office by office by a form of signalling selected from the group consisting of dial pulse signalling and multi-frequency signalling, and (j) said means in said sending office responsive to said proceed-to-send signal is adapted to transmit said called number end-to-end from the sending office to the gateway office over said talking connection by multi-frequency signalling.

4. A system according to claim 2, including (h) a crossbar end office, said call originating from a subscriber coupled to said end office, with an initial overseas access code preceding said called number, (i) said end office including means for recognizing said access code and for establishing a connection to said sending office for the digits of said called number to be transmitted directly from said subscriber to said sending office without storage and regeneration in said end office, (j) said means (i) including by-link means for the establishing of the connection between said end office and said sending office in the interdigital time between the last digit of said access code and the first digit of said called number.

5. A system for processing a direct distance dialled long distance call from a calling telephone in a first numbering plan complex to a called telephone in a second numbering plan complex, said system comprising (a) a sending office in said first numbering plan complex, (b) a gateway office in said first numbering plan complex, said gateway office having access to a communications link leading to said second numbering plan complex, (c) a plurality of intermediate offices in said first numbering plan complex located intermediate said sending and gateway offices including switching means capable of storing a predetermined maximum number of digits, (d) the number of said called telephone including a plurality of digits greater in number than said predetermined maximum, (e) said sending office including (i) register means of capacity sufficient to store the plurality of digits of the called number, for receiving said called number and storing the same, (ii) means coupled to said means (e) (i) for decoding said called number to determine said gateway office to which said call is to be routed, and for providing prefixed digits for routing said call from said sending office to said gateway office, said prefixed digits being less in number than said maximum number of digits, (iii) and means coupled to said means (e) (i) and (e) (ii) for sending said prefixed digits forward office by office through each of said intermediate offices, to establish through said intermediate offices a talking connection between said sending and gateway offices, (f) said gateway office including means responsive to the establishing of said connection between said sending and gateway offices, for sending a proceed-to-send signal back over said connection to said sending office, (g) said sending office including means responsive to said proceed-to-send signal for transmitting the digits of said called number end-to-end over said talking connection from said sending office to said gateway office, (h) said gateway office including (i) receiving means for receiving said called number digits, (ii) register means coupled to said receiving means for receiving said called number digits therefrom and for storing the same as stored digit information, said register means being of sufficient capacity to store said called number digits, (iii) and means for outpulsing said stored digit information over said communications link.

6. A system according to claim 5 wherein (i) said sending office includes billing means for recording charges for said call, (j) one of said intermediate offices includes an operator position, said operator position including charge key means to permit an operator thereat to prevent charging operation of said billing means until actuation of said charge key means, (k) and said means (e) (ii) in said sending office includes means responsive to inclusion of a person-to-person code in said access code, for routing said call to said operator position.

7. A system according to claim 6 wherein (l) one of said intermediate offices includes receiving means for receiving the called and calling numbers, and (m) said sending office includes means for transmitting said calling number to said one intermediate office.

8. A system according to claim 1 wherein (i) a said intermediate office between said sending and receiving offices is of higher rank than said sending office, (j) said higher rank intermediate office including an operator position, (k) said means (e) (iii) in said sending office including means responsive to dialling of a person-to-person code in advance of the called number, for routing said call through said operator position, (l) said higher rank intermediate office including means for receiving a record of the called and calling numbers from said sending office.

9. A system according to claim 8 wherein said sending office includes billing means for recording charges for said call, and said operator position includes charge key means to permit an operator thereat to prevent charging operation of said billing means until actuation of said charge key means.

No references cited.

WILLIAM C. COOPER, Primary Examiner